No. 881,896.
PATENTED MAR. 17, 1908.
H. E. BROWN.
WINDMILL OILER.
APPLICATION FILED JULY 9, 1907.
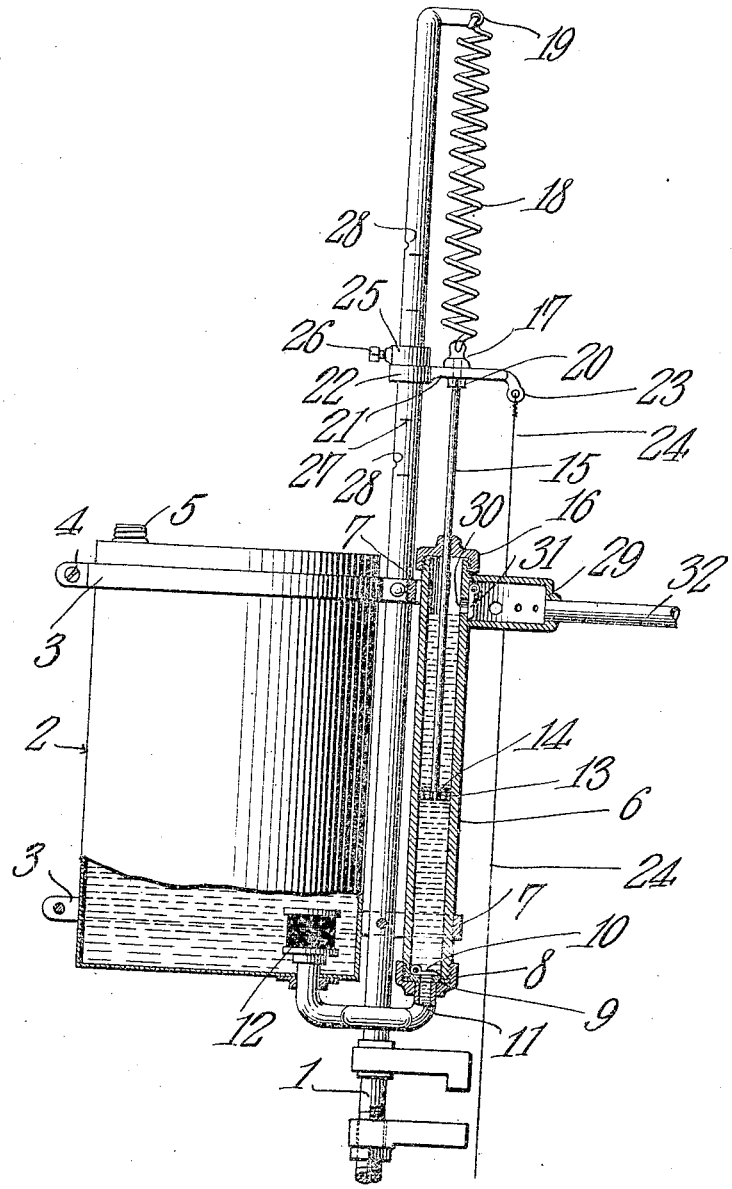
WITNESSES:
Herbert E. Brown,
INVENTOR.
By C. A. Snow & Co.
ATTORNEYS

UNITED STATES PATENT OFFICE.

HERBERT EDDES BROWN, OF GOLDTHWAITE, TEXAS.

WINDMILL-OILER.

No. 881,896.

Specification of Letters Patent.

Patented March 17, 1908.

Application filed July 9, 1907. Serial No. 382,852.

*To all whom it may concern:*

Be it known that I, HERBERT EDDES BROWN, a citizen of the United States, residing at Goldthwaite, in the county of Mills and State of Texas, have invented a new and useful Windmill-Oiler, of which the following is a specification.

This invention has reference to improvements in windmill oilers, and its object is to provide an oiling device to be located on the windmill head and to be operated from the ground or other convenient point.

The invention consists essentially in a suitable reservoir for the lubricating oil, with a force pump connected therewith arranged to deliver the oil under pressure to the bearings to be lubricated whether such bearings are located above or below the lubricating device. Provision is made for regulating the length of the stroke of the pump so that at each stroke the pump may be made to deliver a greater or less quantity of oil, whereby, without changing the proportions of the parts, the device may be adapted to windmills of different sizes and requiring different quantities of oil for the bearings. Furthermore, provision is made for delivering different quantities of oil to the different bearings in accordance with their needs by providing conduits of different sizes, so that when the oil is put under pressure to be delivered to the various bearings some bearings will receive a larger quantity than others, depending on their size and need of lubrication.

The invention will be fully understood from the following detailed description, taken in connection with the accompanying drawing forming part of this specification, in which, the figure shows a side elevation, partly in section, of the improved windmill lubricator.

Referring to the drawing, there is shown an upright stem 1 which is presumed to be adapted to be attached by a clamp to the heads of windmills. Secured to this stem there is a tank or reservoir 2 of suitable capacity and which is designed to contain a supply of lubricating oil. This tank is secured to the stem 1 by means of straps 3 which may be bolted or riveted to the stem as desired, and after passing around the tank 2 may be secured together by screws or bolts 4 at their outer meeting ends. At the upper end the tank may be provided with a suitable screw-cap 5 covering the filler opening. Adjacent to the tank is a pump cylinder 6 which may, if desired, be secured to the stem 1 by continuations 7 of the straps 3. The lower end of the pump cylinder is closed by a reducing cap 8 which secures to the lower end of the cylinder a valve seat 9 carrying a flap or other type of valve 10. The reducing cap 8 receives one end of a pipe 11, the other end of which is introduced into the bottom of the casing and terminates in a strainer 12.

Within the pump cylinder is a piston 13 provided with a valve 14 and secured on one end of a piston-rod 15, which latter passes upward through an upper cap 16 applied to the upper end of the cylinder and finally terminates in an eye 17 receiving the lower end of a helical spring 18, the upper end of which latter is fast on a side extension 19 formed on the upper end of the stem 1.

Between the eye 17 and a suitable clamp nut 20 there is fast upon the rod 15 a guide bracket 21 formed with an eye 22 at one end of such size as to slide upon the stem 1, and at the other end this bracket 21 is formed with an eye 23 to which is fast a cord or wire 24 extending, if desired, to the ground, or to a point within easy reach of an operator.

Upon the stem 1 there is a collar 25 provided with a set-screw 26. This collar is adjustable to different points along the stem, and the latter is divided up by indications 27 or notches 28, or both, as may be desired. When the indications are used the collar 25 is moved to the desired indication and is there fastened by the set-screw 26. When the notches 28 are used the set-screw will enter the desired notch and there hold the collar, and where both are used the collar is simply moved to an indication and the screw is caused to enter the notch and so hold the collar 25 from accidental displacement.

Near the top of the pump there is formed a small chamber within a casing 29, which chamber is in communication with the pump through a passage 30 closed by a flap valve 31 so arranged that oil may flow into the chamber from the pump but cannot return from the chamber to the pump. Leading from this chamber are a number of pipes 32 for conducting the oil to the various parts to be lubricated. These pipes will be of different sizes, in accordance with the amount of oil to be delivered through them. For instance, a large journal will need more oil than a small one, or a shaft turning rapidly will need more oil than one turning more slowly. In this way the oil may be distributed in accordance with the needs of the several parts. The passage 30 as well as the pipes 32 are located with reference to the casing 29 near the bottom of the latter so that when oil is forced into the chamber in the casing 29 a certain amount of air is there imprisoned and operates as an elastic cushion for continuing the flow of oil through the pipes after the pump has ceased operating and the valve 31 has closed.

In the drawing the pump cylinder 6 is shown very much larger in proportion to the reservoir 2 than would be the case in practice. The reservoir 2 might be made to contain one or more gallons of oil, while the pump would at full stroke not deliver more than two or three ounces of oil. Now, let it be supposed that the lowermost indication on the stem 1 be equivalent to the delivery of one-half an ounce of oil, and the second indication be equivalent to the delivery of one ounce of oil, and so on. In the drawing the collar 25 is shown coincident with the third indication, and, therefore, the pump is supposed to be set to deliver one and one-half ounces of oil. It will be understood, of course, that the amounts mentioned are only taken as examples and the device may be made to deliver oil in any series of quantities.

Let it be assumed now that the cord or wire 24 is pulled downward. It will be seen that the piston-rod 15 and the piston 13 will participate in this movement, while the spring 18 will be extended and put correspondingly under stress. As the piston 13 descends the oil within the pump below the piston passes upward through the same and by the valve 14. Now, assuming that the piston-rod has been pulled down to the greatest extent, the cord 24 is released and the retraction of the spring 18 will pull the piston upward. Under these conditions the valve 14 closes and the valve 10 opens so that oil flows into the cylinder 6 below the piston, while the oil above the piston is lifted and flows through the opening 30 and by the valve 31 into the chamber in the casing 29. The pump thus acts as a force pump and the oil is driven out through the pipes 32 by the pressure exerted thereon due to the power stored up in the spring 18.

By providing a force feed for the oil it is not necessary that the tank 2 or the outlet from the pump be located above the bearings to be lubricated, since the oil can be forced to bearings considerably higher than the pump.

With the structure described it is only necessary to cause the flow of oil to the bearings from time to time, and there is no necessity of climbing the tower to reach the bearings, as is customary when these bearings are oiled directly by hand. It is also possible to connect the cord or wire 24 or the piston-rod to the throw-off mechanism for the windmill, so that when the latter is moved to the inoperative position, which it is only occasionally, the pump may be operated to deliver oil to the bearings.

I claim:—

1. A windmill lubricator comprising a suitable reservoir, a pump, means for actuating the pump, a valved chamber into which the pump delivers, and pipes leading from said chamber to the parts to be lubricated, the pipes and valve communicating with the chamber near its lower end.

2. A windmill oiler comprising a suitable reservoir, a force pump connected to the lower end of the reservoir and extending upward alongside of the same, a chamber at the upper end of the pump into which the oil is delivered by the pump, a valve between said chamber and the pump, and conduits leading from the chamber to the parts to be lubricated, the valve and conduits opening into the lower end of said chamber.

3. A windmill lubricator comprising a suitable reservoir, a pump, and connections for delivering oil from the reservoir to the parts to be lubricated, a spring for moving the pump piston on its power stroke, a fixed guide adjacent to the pump rod carrying one end of the spring, a sliding connection between the guide and pump rod, and an adjustable stop on the guide in the path of the slide fast on the pump rod.

4. A windmill oiler comprising a suitable reservoir, a force pump connected therewith, a valved chamber connected with the delivery end of the force pump, conduits of different capacities leading from the valved chamber to the parts to be lubricated, a supporting stem for the reservoir and pump, a spring carried by the stem and connected to the piston-rod and tending to move the pump piston in the delivery direction, a bracket fast on the piston-rod and sliding on said stem, a connection from said bracket to a distant point of manipulation, and an adjustable stop carried by said stem in the path of the bracket traveling thereon.

In testimony that I claim the foregoing as my own, I have hereto affixed my signature in the presence of two witnesses.

HERBERT EDDES BROWN.

Witnesses:
T. J. ADCOCK,
H. T. WHITE.